United States Patent
De Nardis

(10) Patent No.: US 10,024,603 B2
(45) Date of Patent: Jul. 17, 2018

(54) DOUBLE TUBING CONDENSATION EXCHANGER FOR HEATING WATER AND/OR FOR PRODUCING SANITARY HOT WATER

(71) Applicant: Riello S.p.A., Legnago (IT)

(72) Inventor: Marco De Nardis, Villanova Di Cepagatti (IT)

(73) Assignee: Riello S.p.A., Legnago (IT)

( * ) Notice: Subject to any disclaimer, the term of this patent is extended or adjusted under 35 U.S.C. 154(b) by 93 days.

(21) Appl. No.: 14/579,374

(22) Filed: Dec. 22, 2014

(65) Prior Publication Data
US 2016/0146541 A1    May 26, 2016

(30) Foreign Application Priority Data
Nov. 26, 2014    (IT) .............................. RM2014A0686

(51) Int. Cl.
  *F28D 7/02*    (2006.01)
  *F24H 1/43*    (2006.01)
  (Continued)

(52) U.S. Cl.
  CPC .............. *F28D 7/024* (2013.01); *F24H 1/43* (2013.01); *F24H 1/445* (2013.01); *F24H 8/00* (2013.01); *F24H 9/0031* (2013.01); *F28D 7/022* (2013.01); *F28D 7/0083* (2013.01); *F28F 1/025* (2013.01); *F28F 1/04* (2013.01); *F28F 13/06* (2013.01); *Y02B 30/102* (2013.01)

(58) Field of Classification Search
  CPC .............. F24H 1/43; F24H 8/00; F28D 7/024
  USPC .................... 165/135, 163, 913; 122/18.1, 33
  See application file for complete search history.

(56) References Cited

U.S. PATENT DOCUMENTS

RE33,082 E  *  10/1989  Gerstmann et al. .. F24D 11/004
                                                       122/20 B
7,281,497 B2 *  10/2007  Le Mer et al. ........... F24H 1/43
                                                       122/18.1
(Continued)

FOREIGN PATENT DOCUMENTS

EP    1281919 A2    2/2003
EP    2096372 A2    9/2009
(Continued)

OTHER PUBLICATIONS

Italian Search Report dated Jul. 1, 2015, in connection with corresponding Italian Application No. IT RM20140686 (8 pgs.).

*Primary Examiner* — Allen Flanigan
(74) *Attorney, Agent, or Firm* — Maier & Maier, PLLC

(57) ABSTRACT

A condensation exchanger for heating of water and for production of sanitary water, providing a first inner coil with plain surface, and a second outer coil, said second coil being externally spirally wound with respect to said first coil, within said coils circulating a thermal carrier fluid, said first coil exchanging heat with combustion fumes by radiation and convection, and said second coil exchanging heat with the combustion fumes by condensation, wherein said second coil has a plain surface, and in that an insulating septum is provided, said septum dividing said exchanger in a first upper or combustion zone, and a second lower zone, said insulating septum dividing said exchanger in said two areas with a ratio of:

$$45\% \leq H_1 L \leq 60\%.$$

6 Claims, 5 Drawing Sheets

(51) Int. Cl.
    *F24H 1/44*    (2006.01)
    *F24H 8/00*    (2006.01)
    *F24H 9/00*    (2006.01)
    *F28F 13/06*    (2006.01)
    *F28D 7/00*    (2006.01)
    *F28F 1/02*    (2006.01)
    *F28F 1/04*    (2006.01)

(56) References Cited

U.S. PATENT DOCUMENTS

| | | | |
|---|---|---|---|
| 7,302,916 B2 * | 12/2007 | LeMer et al. | F24H 1/43 122/15.1 |
| 7,428,883 B2 * | 9/2008 | Hamada et al. | F24H 1/43 122/31.1 |
| 2007/0209606 A1 * | 9/2007 | Hamada et al. | F24H 1/43 122/18.1 |
| 2008/0186039 A1 * | 8/2008 | Cannas | F24H 1/43 324/750.28 |
| 2011/0185985 A1 * | 8/2011 | Ahmady | F24H 1/18 122/18.1 |
| 2012/0312513 A1 * | 12/2012 | Le Mer et al. | F24H 1/43 165/159 |

FOREIGN PATENT DOCUMENTS

| | | | | |
|---|---|---|---|---|
| EP | 2504632 | A2 | 10/2012 | |
| EP | 2505932 | A1 | 10/2012 | |
| WO | WO 2011064804 | A2 * | 6/2011 | F24H 1/43 |

\* cited by examiner

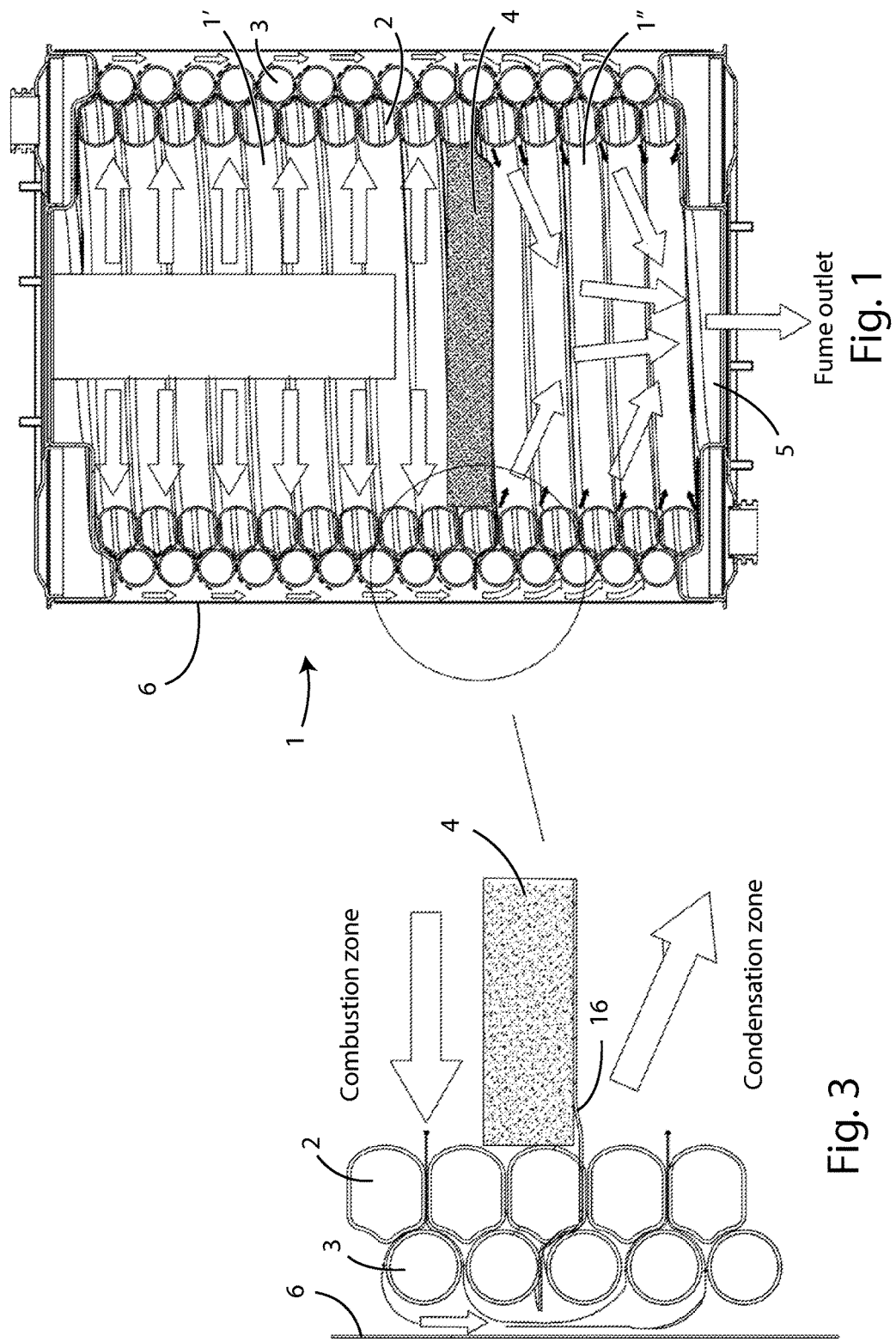

US 10,024,603 B2

DOUBLE TUBING CONDENSATION EXCHANGER FOR HEATING WATER AND/OR FOR PRODUCING SANITARY HOT WATER

FIELD OF THE INVENTION

The present invention concerns a double tubing condensation exchanger for heating water and/or for producing sanitary hot water.

More specifically, the invention concerns a fume-liquid heat exchanger permitting obtaining very high efficiencies with low specific losses both on the fluid and the fume sides.

BACKGROUND

Many solutions are available on the market for condensation heat exchangers providing the use of a coil.

Particularly, by Italian patent n° 1396729 (corresponding to EP application 2504632), the same Applicant has proposed a solution providing a condensation heat exchanger with two separated spiral wound tubes, respectively one plain (inner) and the other one corrugated (outer).

Pairing of these two different coils permits obtaining an optimum heat exchange, by differentiating the type of exchange surface as a function of the fluid temperature with which it meets. Within the combustion chamber, characterized by high temperatures caused by combined effects of heat exchange due to irradiation and convection, it is provided a heat exchanger comprised of a plain coil, while in zone with lower fume temperature, where condensation phenomenon of gaseous compound starts, it is provided a second corrugated coil, to maximize heat exchange ad promote proper outflow of condensate. Two coils are placed in series with respect to the gaseous products flow and in parallel with respect to the heat carrier fluid.

However, while developing the solution described in IT'729, it has been discovered that the solution suggested does not permit completely obtaining the results set, as far as heat exchanger costs, reliability of the same, corrosion resistance, mechanical resistance and efficiency are concerned.

Particularly, it has been determined that fume circuit described in IT'729 does not permit obtaining the maximum efficiency during condensation heat exchange with outer coil.

Further, it has been found that corrugated outer coil is not convenient as far as reliability against corrosion and mechanical resistance are concerned.

Furthermore, solution suggested in IT'729 does not permit optimizing efficiency since turns of first and/or second coil can prevent an optimum passage of fumes.

SUMMARY

In view of the above, it is suggested according to the present invention an improved double tubing condensation heat exchanger for heating water and/or for producing sanitary hot water permitting overcoming the above mentioned drawbacks, providing technical solutions apt to improve fume circulation within heat exchanger, and thus efficiency of the same.

It is therefore specific object of the present invention a condensation exchanger for heating of water and/or for production of sanitary hot water, providing, in parallel, a first inner coil with plain surface, and a second outer coil, said second coil being externally spirally wound with respect to said first coil, within said first and second coils independently circulating a thermal carrier fluid, said first coil exchanging heat with combustion fumes mainly by radiation and convection, and said second coil exchanging heat with the combustion fumes mainly by condensation, said exchanger being characterized in that said second coil has a plain surface, and in that an insulating septum is provided, said septum dividing said exchanger in a first upper or combustion zone, and in a second lower or condensation zone, said insulating septum dividing said exchanger in said two areas with a ratio set by the following formula $$45\% \leq H_1 \leq 60\%$$

wherein L is the height of the exchanger and $H_1$ the height of the first zone.

Preferably, according to the invention, said first coil, has a pseudo-pentagonal section, so as to conform to the profile of said second coil, and said second coil has a circular section.

Still according to the invention, said first coil is mechanically deformed so as to realize projections on its outer profile.

Always according to the invention, said second coil is mechanically deformed so as to realize projections on its outer profile.

Furthermore, according to the invention, a first bulkhead is provided, having or not having holes or openings, outside said second coil, in correspondence of the first zone of the heat exchanger, said holes or openings being realized in correspondence of the single turns of said second coil, or slightly offset upward or downward the same turns.

Furthermore, according to the invention, a second bulkhead is provided having or not having holes or openings, inside said first coil, in correspondence of the first zone of the heat exchanger, said holes or openings being realized in correspondence of the single turns of said second coil, or slightly offset upward or downward the same turns.

Finally, according to the invention, said septum is supported by coupling a support element among the turns of the coil.

BRIEF DESCRIPTION

The present invention will be now described, for illustrative, but not limitative, purposes, according to preferred embodiments, with particular reference to the enclosed figures, wherein:

FIG. 1 shows a longitudinal section of a first embodiment of the heat exchanger according to the invention, and a scheme of the flow of combustion fumes;

FIG. 3 shows a section view of a particular of heat exchanger of FIG. 1;

In the different figures, even if making reference to different embodiments, equal or similar parts will be indicated by the same references.

DETAILED DESCRIPTION OF THE DRAWINGS

Figure 2C:
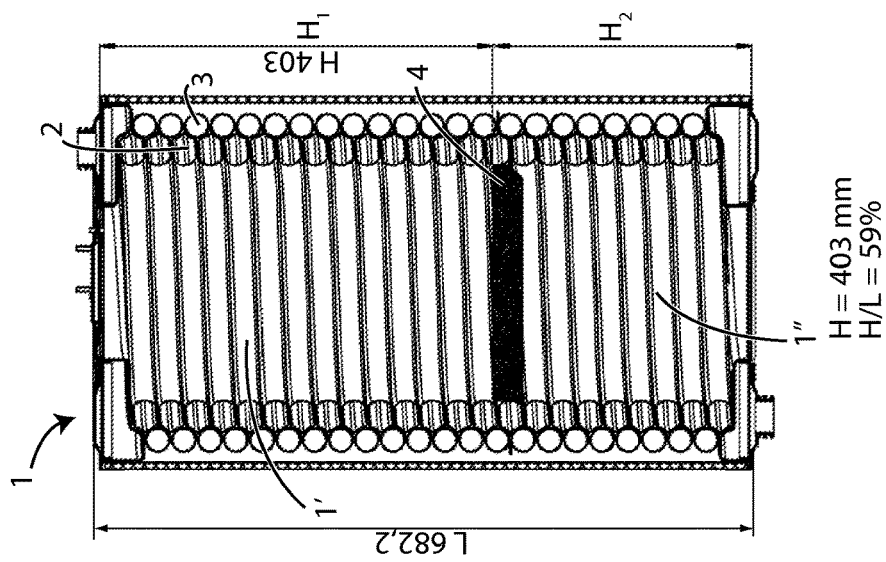
FIGS. 2a, 2b and 2c show specific arrangements of heat exchanger of FIG. 1.

Observing first FIG. 1 of the enclosed drawings, it is shown a first embodiment of the heat exchanger according to the invention, generically indicated by reference number 1.

Heat exchanger 1 provides two plain coils, respectively an inner one 2 and an outer one 3, provided concentrically each other. Inner coil 2 has a pseudo-pentagonal section, while coil 3 has a circular section.

Heat exchanger 1 further provides an insulating refractory septum 4, provided at a set height, as it will be better described with reference to FIGS. 2a-2c, so as to obtain the fume flow schematically shown in FIG. 1.

By reference number 5 it is indicated fume outlet zone. Substantially, insulating septum 4 divides heat exchanger 1 into an upper or combustion zone 1' and a lower or condensation zone 1".

Within zone 1', fumes entering from above pass through first coil 2, with a heat exchange mainly by irradiation or convention, while within zone 1" heat exchange mainly occur by condensation.

Substantially, fumes 1 follow arrows A within part 1', pass through portions of coils 2 and 3 provided in zone 1' outward, descend along the housing 6 wall, entering again, in correspondence of portion 1" of heat exchanger 1, through outer coil 3, the inner one 2 and thus editing from opening 5.

Figure 2B:
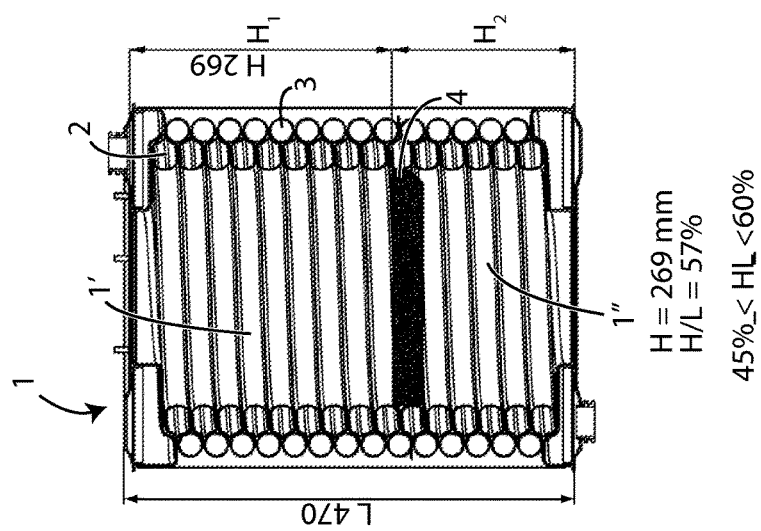
Figure 2A:
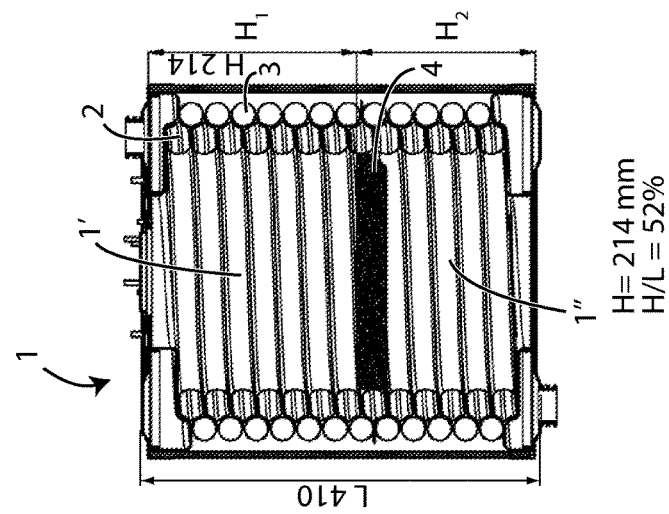

Three specific embodiments of heat exchanger 1 according to the invention are shown in FIGS. 2a-2c, with the main object of providing a technical indication of positioning of insulating septum 4 with respect to volume of heat exchanger 1.

Particularly, it is noted that in FIG. 2a, with a height of heat exchanger 1 of L=410 mm, zone 1' has a height $H_1$=214 mm, and zone 2" has a height $H_2$=196 mm, with a ratio $H_1/L$=52%.

Heat exchanger of FIG. 2b instead has a height of heat exchanger 1 of L=470 mm, with zone 1' has a height $H_1$=269 mm, and zone 2" has a height $H_2$=201 mm, with a ratio $H_1/L$=57%.

Finally, heat exchanger of FIG. 2c has a height of heat exchanger 1 of L=682 mm, with zone 1' has a height $H_1$=403 mm, and zone 2" has a height $H_2$=279 mm, with a ratio $H_1/L$=59%.

Thus, it has been determined that, to obtain an optimum efficiency of heat exchanger 1 according to the invention, it must be respected the following formula: $45\% \leq H_1/L \leq 60\%$.

FIG. 3 shows in detail the function of insulating septum 4 to divide heat exchanger 1 into the combustion none 1' and condensation zone 1", with the fume circulation shown in the drawing. In this case, septum 4 is supported by fitting a support element 16 between turns of coil 2.

It is observed how insulating septum 4 is a solution known in the art, commonly used to divide the chamber in two parts. However, specific positioning claimed according to the invention, respecting the proportion set forth in the above, permits optimising efficiency of heat exchanger 1 according to the invention.

Six variants of the heat exchanger according to the invention are shown in FIGS. 4a-4f.

Figure 4C:
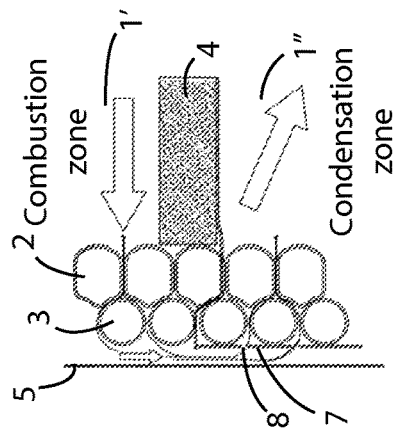
FIGS. 4a, 4b, 4c, 4d, 4e and 4f show section views of six variants of heat exchanger of FIG. 1, and a scheme of flow of combustion fumes.
Figure 4F:
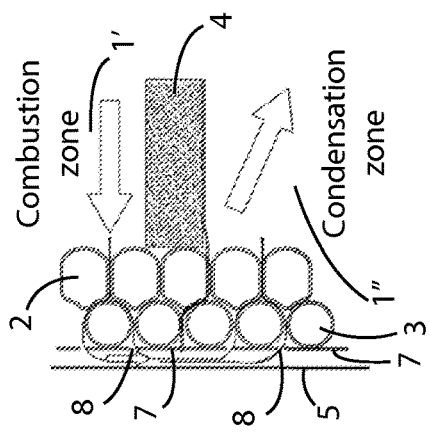
Figure 4B:
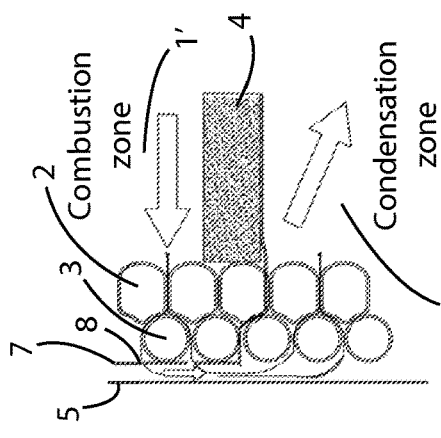
Figure 4E:
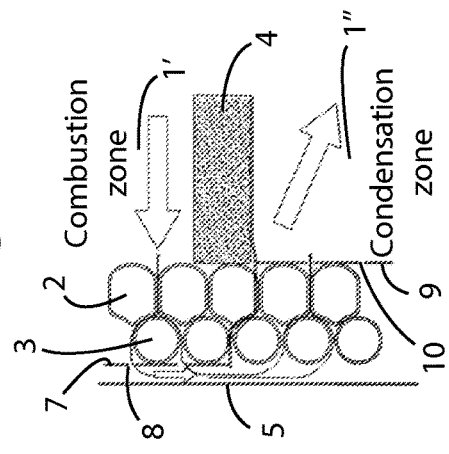
Figure 4A:
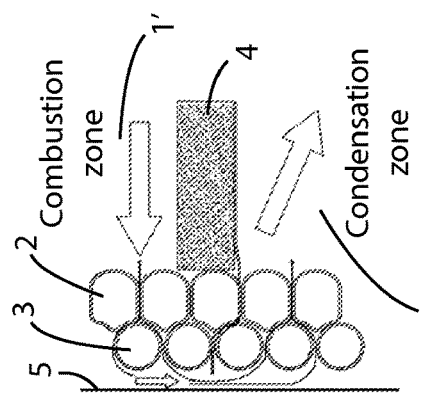

Particularly, FIG. 4a shows the scheme of heat exchanger of FIG. 1, while FIG. 4b shows a bulkhead 7, provided with holes 8, provided outside the coil 4, in correspondence of the zone 1' of the heat exchanger 1. Holes 8 are particularly provided substantially at the height of each turn of coil 3. Thus, it is remarkably improved heat exchange and fume circulation. A bulkhead 7 similar to the one shown in FIG. 4b is provided in FIG. 4c, in this case outside coil 3, but in correspondence of zone 1" of heat exchanger 1 according to the invention, i.e. in correspondence of the condensation zone. Bulkhead 7 will always be provided with holes 8 for fume passage.

Figure 4D:
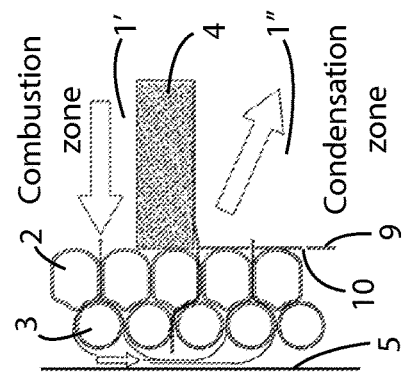

Instead, solution of FIG. 4d provides a bulkhead 9 provided with holes 10 for fume passage, within coil 2, in correspondence of condensation zone.

Instead, solution of FIG. 4e combines solutions shown in FIG. 4b and FIG. 4d.

Finally, a solution is shown in FIG. 4f providing only bulkhead 7 outside coil 3, but provided in correspondence both of combustion zone 1' and combustion zone 1" of heat exchanger 1 according to the invention.

Holes 8 and/or 10 of bulkheads 7 and/or p can be at the height of turns of coil 3 and 2, respectively, i.e. offset each other, upward and downward, to optimize circulation of fumes within heat exchanger according to the invention.

Figure 5:
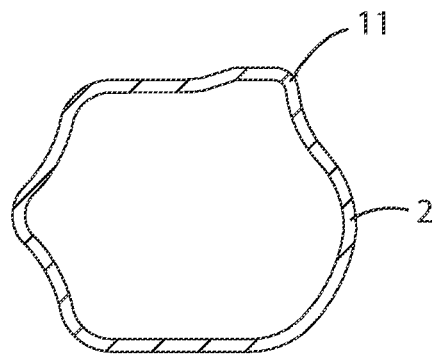
FIG. 5 shows a section view o fan executive variant of the particular of heat exchanger of FIG. 1.
Figure 6:
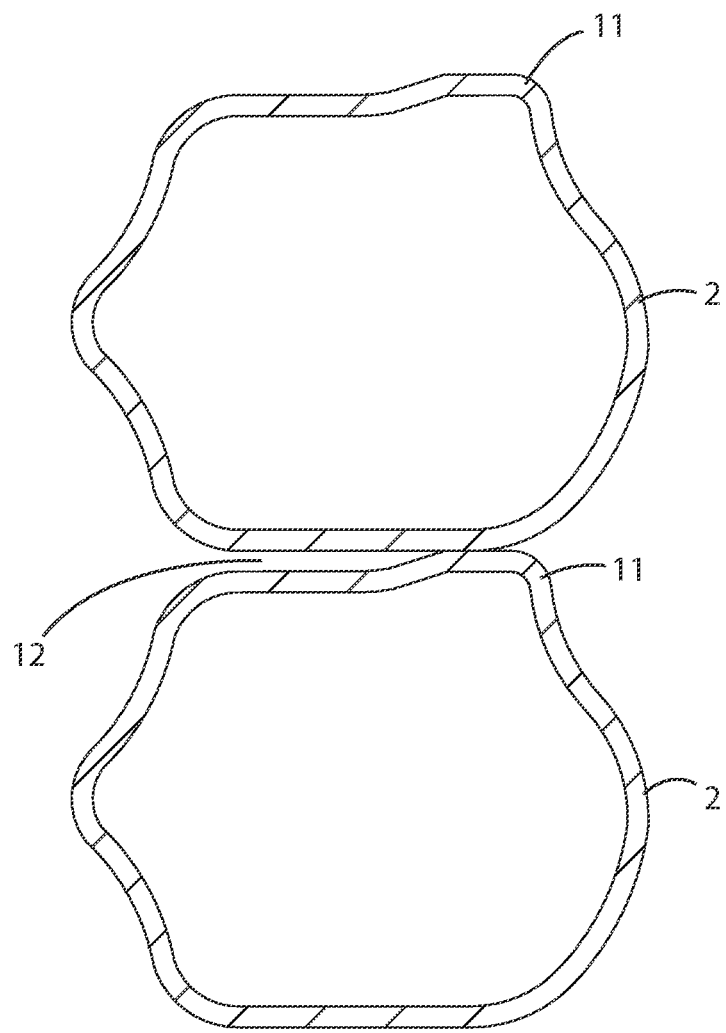
FIG. 6 shows a section view of a particular of the executive variant of FIG. 5.

Coming now to FIGS. 5 and 6, it is shown a technical solution providing mechanical deformation of inner coil 2 profile having a pseudo-pentagonal section, in order to obtain, along its extension, projections 11 that, when assembling the heat exchanger 1 according to the invention (see particularly FIG. 6) permits obtaining a space 12 between single turns for a better passage of fumes, and thus a better efficiency of the same heat exchanger 1. Said space 12 will preferably have a height within the range between 0.5 and 2 mm.

Figure 7:
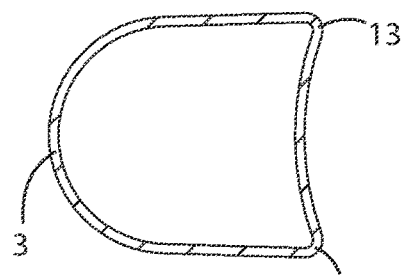
FIG. 7 shows a section view of an executive variation of a second particular of heat exchanger of FIG. 1.

A similar processing can be carried out on tube of outer coil 3 that is deformed as shown in FIG. 7 creating two projections 13.

Figure 8:
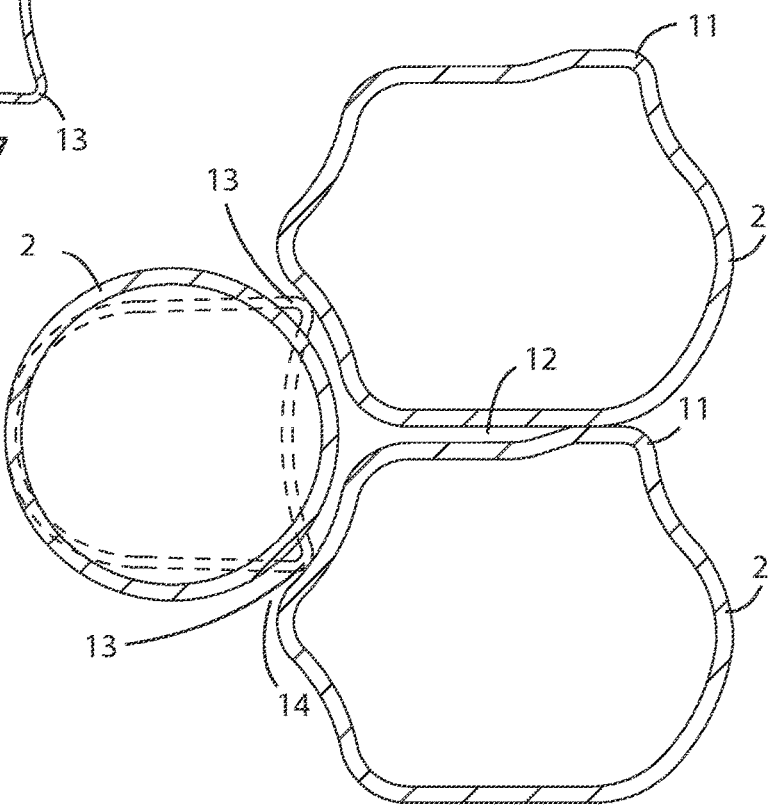
FIG. 8 shows a section view of a particular combining variant of FIGS. 5 and 7.

Combination of the two processing of coils 2 and 3, creating projections 11 and 13, and realization of spaces 12 and 14 (shown for the first time in FIG. 8) permits mounting coils 2 and 3 as shown in FIG. 8.

In this way, a remarkable improvement of fume circulation is obtained, and thus of heat exchange in the various zones of heat exchanger.

Spaces 12 and 14 will both have dimensions within the range 0.5-2 mm indicated in the above, but they not necessarily will have the same height.

Figure 9:
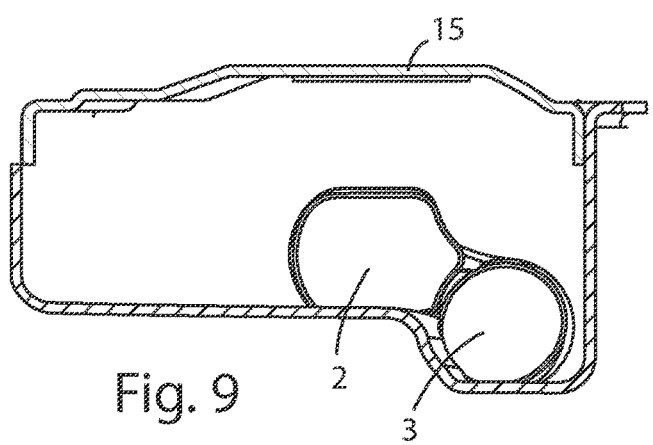
FIG. 9 shows a section of a particular of the heat exchanger of FIG. 1.

Finally, in FIG. 9 it is shown coupling of pseudo-pentagonal tubes of coil 2 and circular tubes of coil 3 at the inlet of heat exchanger, in correspondence of lower closure 15 of tank 16.

The present invention has been described for illustrative, but not limitative, purposes, according to its preferred embodiments, but it is to be understood that variations and/or modifications can be introduced by those skilled in the art without departing from the relevant scope, as defined in the enclosed claims.

The invention claimed is:

1. Condensation exchanger for heating of water and for production of sanitary hot water, comprising:
    in parallel, a first inner coil with a plain surface, and a second outer coil, said second coil being externally spirally wound with respect to said first coil, within said first and second coils independently circulating a thermal carrier fluid, said first coil exchanging heat with combustion fumes mainly by radiation and convection, and said second coil exchanging heat with the combustion fumes mainly by condensation, wherein said second coil has a plain surface, a housing that encloses both said second coil and said first coil, wherein a top and a bottom of the housing are covered, and in that an insulating septum is provided, said septum dividing said exchanger in a first upper or combustion zone, wherein fumes pass through the first inner coil and then through the second outer coil with a heat exchange mainly by irradiation or convention, and in a second lower or condensation zone, wherein fumes pass through the second outer coil and then through the first inner coil with a heat exchange mainly by condensation, said insulating septum dividing said exchanger in said two areas with a ratio set by the following formula $$45\% \leq H1/L \leq 60\%$$

wherein L is the height of the housing from the top to the bottom and H1 is the height of a first zone which is from the top to said insulating septum, wherein a first bulkhead, having one or more holes or openings, is provided outside said second coil, enclosing said second coil in a cylindrical form for said holes or openings to be fume passages, in correspondence to at least one of the first zone or the second zone of the heat exchanger, said holes or openings being realized slightly offset downward of the single turns of the second coil.

2. Condensation exchanger for heating of water and for production of sanitary hot water according to claim 1, wherein said first coil has a noncircular section provided with concave portions corresponding in shape to the outer profile of adjacent turns of said first coil, so as to conform to the profile of said second coil and to provide fume passages between single turns of said first second coil, and in that said second coil has a circular section.

3. Condensation exchanger for heating of water and for production of sanitary hot water according to claim 1, wherein said first coil is mechanically deformed so as to realize projections on its outer profile.

4. Condensation exchanger for heating of water and for production of sanitary hot water according to claim 1, wherein said second coil is mechanically deformed so as to realize projections on its outer profile.

5. Condensation exchanger for heating of water and for production of sanitary hot water according to claim 1, wherein a second bulkhead is provided having at least one or more holes or openings, inside said first coil being enclosed by said first coil in a cylindrical form for said holes or opening to be fume passages, in correspondence to the second zone of the heat exchanger, said holes or openings being realized in correspondence to one of the single turns of said first coil, or slightly offset upward or downward of the single turns of the first coil.

6. Condensation exchanger for heating of water and for production of sanitary hot water according to claim 1, wherein said septum is supported by coupling a support element among the turns of the coil.

* * * * *